US012355081B2

(12) United States Patent
Kumar et al.

(10) Patent No.: US 12,355,081 B2
(45) Date of Patent: Jul. 8, 2025

(54) MULTILAYER AND/OR MULTIDIMENSIONAL ELECTRODE FILMS FOR ENERGY STORAGE DEVICES, AND METHODS THEREOF

(71) Applicant: Ocella, Inc., Newberry, IN (US)

(72) Inventors: Rajan Kumar, Bloomington, IN (US); Kevin Barry, Bloomington, IN (US)

(73) Assignee: Ocella, Inc., Newberry, IN (US)

( * ) Notice: Subject to any disclaimer, the term of this patent is extended or adjusted under 35 U.S.C. 154(b) by 0 days.

(21) Appl. No.: 17/662,906

(22) Filed: May 11, 2022

(65) Prior Publication Data

US 2022/0416247 A1 Dec. 29, 2022

Related U.S. Application Data

(60) Provisional application No. 63/187,202, filed on May 11, 2021.

(51) Int. Cl.
- *H01M 4/62* (2006.01)
- *H01M 4/04* (2006.01)
- *H01M 4/13* (2010.01)
- *H01M 4/139* (2010.01)
- *H01M 4/02* (2006.01)

(52) U.S. Cl.
CPC ......... *H01M 4/622* (2013.01); *H01M 4/0492* (2013.01); *H01M 4/139* (2013.01); *H01M 2004/021* (2013.01)

(58) Field of Classification Search
CPC .......... H01M 4/04; H01M 4/13; H01M 4/139; H01M 4/0492; H01M 4/682
See application file for complete search history.

(56) References Cited

U.S. PATENT DOCUMENTS

| | | | |
|---|---|---|---|
| 2005/0048366 A1* | 3/2005 | Bowden | H01M 4/06 429/231.1 |
| 2012/0328942 A1* | 12/2012 | Thomas-Alyea | H01M 4/587 429/211 |
| 2013/0004843 A1* | 1/2013 | Suzuki | H01M 4/13 29/623.5 |
| 2013/0022867 A1* | 1/2013 | Suzuki | H01M 4/13 429/211 |
| 2013/0260207 A1* | 10/2013 | Uemura | H01M 10/4235 521/134 |
| 2017/0104205 A1* | 4/2017 | Ishii | H01G 11/86 |
| 2017/0317338 A1* | 11/2017 | Woehrle | H01M 4/139 |
| 2018/0114986 A1* | 4/2018 | Baek | H01M 4/382 |
| 2018/0337396 A1* | 11/2018 | Kim | H01M 4/139 |

OTHER PUBLICATIONS

T. S. Arthur et al., "Three-dimensional electrodes and battery architectures," *MRS Bull.*, vol. 36, No. 7, pp. 523-531, Jul. 2011, doi: 10.1557/MRS.2011.156.

(Continued)

*Primary Examiner* — Kenneth J Douyette
(74) *Attorney, Agent, or Firm* — Knobbe, Martens, Olson & Bear, LLP

(57) ABSTRACT

The present disclosure describes energy storage (e.g., electrochemical) devices with customized architectures. Such customized architectures include multilayered electrode films and/or multidimensional electrode films.

20 Claims, 5 Drawing Sheets

(56) References Cited

OTHER PUBLICATIONS

B. De, A. Yadav, S. Khan, and K. K. Kar, "A Facile Methodology for the Development of a Printable and Flexible All-Solid-State Rechargeable Battery," *ACS Appl. Mater. Interfaces*, vol. 9, No. 23, pp. 19870-19880, Jun. 2017, doi: 10.1021/acsami.7b04112.
D. Ding et al., "Li-ion conducting glass ceramic (LICGC)/reduced graphene oxide sandwich-like structure composite for high-performance lithium-ion batteries," *J. Power Sources*, vol. 500, p. 229976, Jul. 2021, doi: 10.1016/J.JPOWSOUR.2021.229976.
Z. Du, C. J. Janke, J. Li, and D. L. Wood, "High-Speed electron beam curing of thick electrode for high energy density Li-ion batteries," *Green Energy Environ.*, vol. 4, No. 4, pp. 375-381, Oct. 2019, doi: 10.1016/j.gee.2019.04.001.
K. B. Hatzell and Y. Zheng, "Prospects on large-scale manufacturing of solid state batteries," *MRS Energy Sustain.*, pp. 1-7, Mar. 2021, doi: 10.1557/s43581-021-00004-w.
M. J. Palmer et al., "A three-dimensional interconnected polymer/ceramic composite as a thin film solid electrolyte," *Energy Storage Mater.*, vol. 26, pp. 242-249, Apr. 2020, doi: 10.1016/J.ENSM.2019.12.031.
Q. Zhao, S. Stalin, C. Z. Zhao, and L. A. Archer, "Designing solid-state electrolytes for safe, energy-dense batteries," *Nature Reviews Materials*, vol. 5, No. 3. Nature Research, pp. 229-252, Mar. 1, 2020, doi: 10.1038/s41578-019-0165-5.
EnPower, Inc., Technical White Paper, Multilayered Electrode Architectures for Lithium-ion Batteries. Dec. 7, 2020.
"12 Amazing Battery Innovations That Could Change The World." https://interestingengineering.com/13-amazing-battery-innovations-that-could-change-the-world (dated Oct. 18, 2021).

* cited by examiner

MULTILAYER AND/OR MULTIDIMENSIONAL ELECTRODE FILMS FOR ENERGY STORAGE DEVICES, AND METHODS THEREOF

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57, such as U.S. Provisional App. No. 63/187,202, filed May 11, 2021.

BACKGROUND

Field

The present disclosure generally relates to energy storage devices, such as batteries: thermoelectric and photoelectric, supercapacitors. More specifically, the present disclosure relates to energy storage devices (e.g., electrochemical devices) with customized electrode film architectures.

Description of the Related Art

Electrochemical devices include batteries, fuel cells, electrochemical sensors (e.g., glucose monitors) and bio-fuel cells. Typical existing energy storage devices (e.g., batteries) may be deficient with regard to several aspects, for example with regard to charge/discharge rates, total energy, power performance, and the rigidity of the energy storage device itself.

Currently, lithium-ion battery (LIB s) technology typically rely on planar, porous electrodes, which achieve an energy density of 200-250 Wh/kg and manufactured at speeds of >20-50 m2/min. In a conventional electrode film composition, a single layer of a material stack is a homogenous composition of ingredients, for example such as an electrochemically active material, conductive additives, and binder (e.g., polymeric binder). Various electrode parameters such as porosity, distribution of each ingredient, conductivity, and adhesion to the substrate can be consistent within the homogenous composition. As the thickness of the electrode in a battery provides increased energy density, it creates additional challenges at various interfaces. For example, the electrode has diminishing power density as increasing thickness creates a more resistive cell. For example, as the electrode thickness increases, its durability becomes compromised especially at the interface with the substrates (copper, aluminum).

Although multidimensional (e.g., 2.5D and 3D) electrode architecture may be utilized to improve performance, the current materials and manufacturing approaches of multidimensional batteries are deficient for commercial applications. For example, current multidimensional electrode architectures do not provide the level of precision, durability, and high-speed coating needed to meet the scale, cost, and performance comparable to that of the planar (1D), porous electrode design in batteries. Furthermore, high-aspect ratios (e.g., 500 um lengths: 100 um diameter) of 3D features need to be robust for the strenuous steps of post-electrode processing, such as calendaring and lamination. In addition, the use of typical polymers and typical conductive additives have demonstrated poor durability even in thicker, planar electrodes. Importantly, the current methods of manufacturing 3D electrodes involve a transfer modeling that is nearly 1000× slower than roll-to-roll processes (0.03 m2/min-based Samsung 300 mm wafer fabrication) used in porous planar electrodes (>50 m2/min based on Megtech Gigacoater).

Therefore, there is a need for improved electrochemical devices.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

According to some embodiments, an electrochemical device with customized architecture using actinic and electron beam radiation is disclosed. Further, the energy storage device (e.g., battery) may include a multilayer electrode film comprising an intermediate electrode film layer and an exterior electrode film layer that provides improved energy storage device (e.g., battery) performances (e.g., lifetime), and may be fabricated using a multi-layer slot die coater or a slip table. In some embodiments, the intermediate layer may include a plurality of layers (e.g., at least a first layer and a second layer). Furthermore, the multilayer electrode film may be disposed over a substrate or base layer (e.g., a current collector), which may include copper. In some embodiments, the first layer may include a first material. In some embodiments, the second layer may include a second material.

In one aspect, a multilayer electrode film is disclosed. The multilayer electrode film comprises: a first electrode film layer comprising a first binder concentration and a first active material concentration; and an exterior electrode film layer comprising an exterior binder concentration and an exterior active material concentration; wherein the first binder concentration is greater than the exterior binder concentration.

In some embodiments, the multilayer electrode film further comprises a bulk electrode film layer disposed between the first electrode film layer and the exterior electrode film layer, wherein the bulk electrode film layer comprises a bulk binder concentration and a bulk active material concentration. In some embodiments, the bulk electrode film layer comprises a plurality of electrode film layers. In some embodiments, the bulk electrode film layer comprises about 85 wt. % to about 90 wt. % active material. In some embodiments, the multilayer electrode film comprises a total thickness of at least 200 µm. In some embodiments, the first electrode film layer comprises about 75 wt. % to about 85 wt. % active material. In some embodiments, the first electrode film layer comprises about 91 wt. % to about 96 wt. % active material.

In another aspect, electrode is disclosed comprising a multilayer electrode film disposed over a current collector. In another aspect, an energy storage device is disclosed comprising: an electrode comprising a multilayer electrode film; a second electrode; a separator disposed between the electrode and second electrode; and a housing, wherein the electrode, second electrode and separator are disposed within the housing.

In another aspect, a method of fabricating multilayer electrode film is disclosed. The method comprises: disposing a first electrode film precursor layer over a substrate; curing the first electrode film precursor layer into a first electrode film layer; disposing an exterior electrode film precursor layer over the first electrode film layer; and curing the exterior electrode film precursor layer into an exterior electrode film layer.

In another aspect, a multidimensional electrode film is disclosed. The multidimensional electrode film comprises: a plurality of multidimensional electrode films portions, wherein each of the plurality of multidimensional electrode films portions comprises a height to thickness aspect ratio; a high-aspect ratio additive; and a polymerized binder.

In some embodiments, the aspect ratio is about 1:1 to 25:1. In some embodiments, the polymerized binder is an electron-beam (EB) curable binder. In some embodiments, the polymerized binder comprises a unit selected from the group consisting of an acrylated polyurethane resin, a hydroxy modified acrylated polyurethane resin, an acrylate-methacrylate monomer blend, a monoacrylate of mono-ethoxylated phenol, trimethylolpropane ethoxy triacrylate, polytetrafluoroethylene, a polyolefin, polyalkylenes, polyethers, styrene-butadiene, co-polymers of polysiloxanes, a polysiloxane, branched polyethers, polyvinylethers, polyacrylic acid (PAA), styrene-butadiene rubber (SBR), co-polymers thereof, and/or admixtures thereof. In some embodiments, multidimensional electrode film further comprises a second electrode film layer. In some embodiments, the second electrode film layer is selected from a multidimensional electrode film layer, a planar electrode film layer, and combinations thereof.

In another aspect, a method of fabricating multidimensional electrode film is disclosed. The method comprises: disposing a mask over a precursor electrode film, wherein the precursor electrode film comprises a polymerizable binder; exposing light radiation through the mask to the precursor electrode film to form a plurality of cured portions and a plurality of uncured portions of the precursor electrode film, wherein the plurality of cured portions comprise a polymerized binder; and removing the plurality of uncured portions to form a multidimensional electrode film comprising the plurality of cured portions.

In some embodiments, removing the plurality of uncured portions comprises exposing the precursor electrode film to a solvent. In some embodiments, the solvent is selected from the group consisting of water, isoborneol acrylate, 1,6-hexanediol diacrylate, toluene, xylene, hexanes, and combinations thereof. In some embodiments, the method further comprises disposing a second precursor layer over the multidimensional electrode film, and curing the second precursor layer to form a second electrode film layer.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

DETAILED DESCRIPTION

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

The present disclosure describes energy storage (e.g., electrochemical) devices with customized architectures. Such customized architectures include multilayered electrode films and/or multidimensional electrode films. In some embodiments, electrodes and/or electrode films may be formed using actinic and electron beam radiation. In some embodiments, the energy storage (e.g., electrochemical) device may include a battery. In some embodiments, the energy storage (e.g., electrochemical) device may include fuel cells, electrochemical sensors (glucose monitors), biofuel cells, and combinations thereof. In some embodiments, the energy storage device (e.g., battery) may be associated with multiple complexities. In some embodiments, the customized energy storage device (e.g., battery) architecture may be characterized by targeted design for applications. In some embodiments, the disclosed energy storage device (e.g., battery) may be a solid-state energy storage device.

Energy Storage Device

Figure 1:
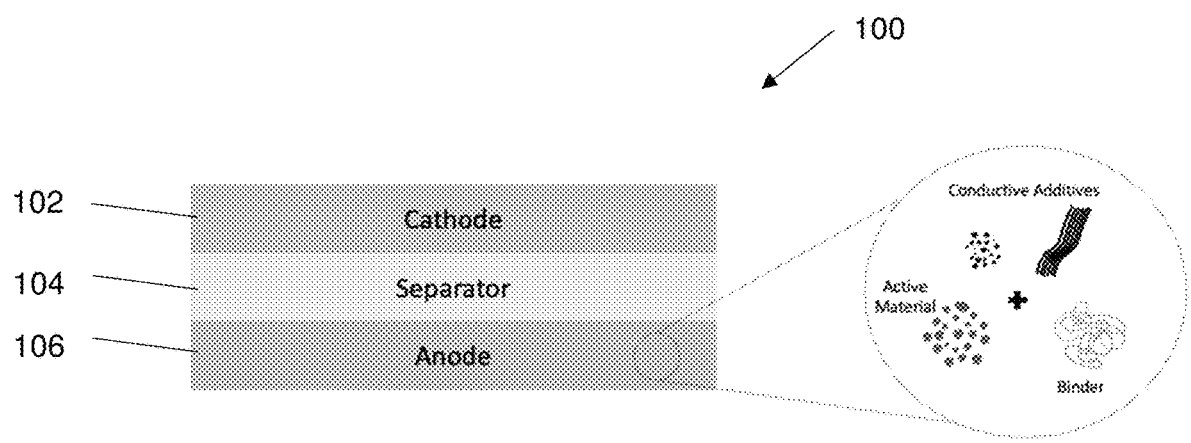
FIG. 1 is an illustration of a cathode, separator and anode assembly, according to some embodiments.

FIG. 1 illustrates an assembly 100 comprising a cathode 102, a separator 104, and an anode 106. The electrodes (i.e., cathode 102 and anode 106) each comprise an electrode film disposed over a current collector. The electrode films comprise an active material and a binder, and may further comprise additional elements such as a conductive additive. As depicted in FIG. 1, the electrode film of the anode 106 includes active material particles, a binder, and conductive additive particles and/or nanostructures.

Figure 2:
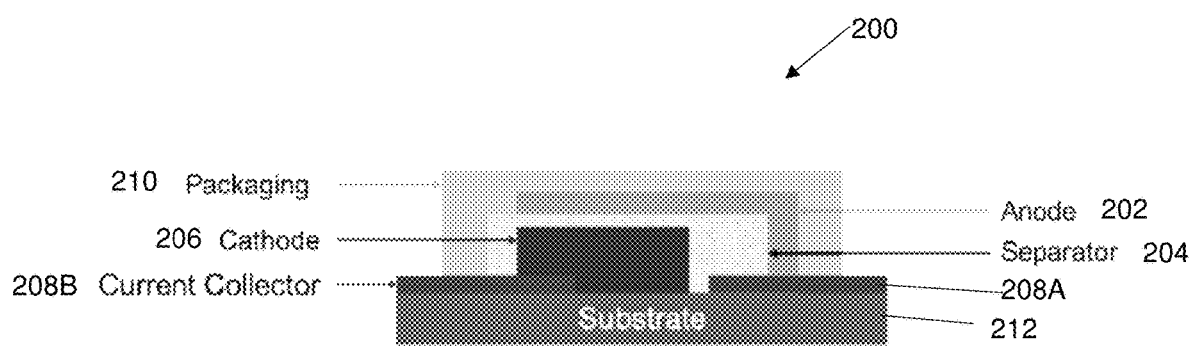
FIG. 2 is an illustration of an energy storage device, according to some embodiments.

FIG. 2 is an illustration of an assembled die cut shaped energy storage device 200. The energy storage device 200 includes an anode 202 and a cathode 206 separated by a separator 204, which is encased in a packaging 210. The anode 202 is in electrical contact with a current collector 208A, and the cathode 206 is in electrical contact with a current collector 208B. All components of the energy storage device 200 are shown disposed over a substrate 212. In some embodiments, the energy storage device 200 may be sealed with a film (e.g., a water-impermeable and/or oxygen-impermeable film) that encases the energy storage device 200. In some embodiments, the energy storage device 200 further includes anode and cathode electrical connectors (e.g., leads and/or tabs) from the anode and cathode current collectors 208A, 208B, respectively, coming out of the sealed film and/or are exposed in order for the energy storage device 200 to make electrical connections with a device in need thereof.

The energy storage device 200 can be a primary or rechargeable energy storage device, and in various forms. Prior to assembly and sealing the cell of the energy storage device 200, the device 200 may be filled with an electrolyte. In some embodiments, the energy storage device 200 is a battery, a capacitor, or a combination thereof. In some embodiments, the energy storage device 200 is a solid state energy storage device such that the energy storage device 200 includes a solid state electrolyte positioned between the cathode 206 and the anode 202. In some embodiments, the solid state electrolyte is in a semisolid (e.g., gel) or solid form.

The energy storage device 200 may include a first electrode 202, 206 that includes a first current collector 208A, 208B in contact with a first electrode film (e.g., a cathode electrode with a cathode electrode film), and a second electrode 202, 206 that includes a second current collector 208A, 208B in contact with a second electrode film (e.g. an anode electrode with an anode electrode film). The first current collector 208A, 208B and the second current collector 208A, 208B may facilitate electrical coupling between each corresponding electrode film and an external circuit (not shown). For example, a current collector 208A, 208B (i.e., base layer) can include a metallic material, such as a material comprising aluminum, nickel, copper, rhenium, niobium, tantalum, and noble metals such as silver, gold, platinum, palladium, rhodium, osmium, iridium and alloys and combinations of the foregoing. For example, a current collector 208A, 208B can comprise a metal foil, for example, a nickel foil, an aluminum foil, a carbon foil, a copper foil, a carbon coated metal foil, or a tantalum coated metal foil. In some embodiments, the current collector 208A, 208B (i.e., base layer) may include copper, aluminum, and coated metal foils, and combinations thereof. An electrode 202, 206 includes at least one electrode film on or disposed over a surface of the current collector 208A, 208B. In some embodiments, the electrode 202, 206 may be a multilayer electrode and comprise more than one electrode film, for example, such as a first electrode film and a second electrode film disposed on the same or different sides of a current collector 208A, 208B. In some embodiments, the multilayered electrode is heterogeneous such that the properties, loading, thickness and/or composition of a first electrode film is different than that of a second electrode film of the electrode.

The electrode film may comprise a cathode active material or an anode active material. In some embodiments, the electrode film comprises the active material in, in about, in at least, or in at least about, 60 wt. %, 65 wt. %, 70 wt. %, 75 wt. %, 80 wt. %, 85 wt. %, 90 wt. %, 92 wt. %, 95 wt. %, 97 wt. %, 98 wt. % or 99 wt. %, or any range of values therebetween.

The cathode active material can include, for example, carbon monofluoride (CFx), metal oxide, metal sulfide, or a lithium metal oxide. The lithium metal oxide can be, for example, a lithium nickel manganese cobalt oxide (NMC), a lithium manganese oxide (LMO), a lithium iron phosphate (LFP), a lithium cobalt oxide (LCO), a lithium titanate (LTO), and/or a lithium nickel cobalt aluminum oxide (NCA). In some embodiments, cathode active materials can comprise, for example, a layered transition metal oxide (such as $LiCoO_2$ (LCO), $Li(NiMnCo)O_2$ (NMC) and/or $LiNi_{0.8}Co_{0.15}Al_{0.05}O_2$ (NCA)), a spinel manganese oxide (such as $LiMn_2O_4$ (LMO) and/or $LiMn_{1.5}Ni_{0.5}O_4$ (LMNO)), an olivine (such as $LiFePO_4$), chalcogenides ($LiTiS_2$), tavorite ($LiFeSO_4F$), silicon, silicon oxide (SiOx), aluminum, tin, tin oxide (SnOx), manganese oxide (MnOx), molybdenum oxide ($MoO_2$), molybdenum disulfide ($MoS_2$), nickel oxide (NiOx), or copper oxide (CuOx).

The anode active materials can include, for example, an insertion material (such as carbon, graphite (natural, synthetic or blends), hard or amorphous carbons and/or graphene), an alloying/dealloying material (such as silicon, silicon oxide, tin, and/or tin oxide), a metallic element, metal alloy or compound (such as Si—Al, and/or Si—Sn), and/or a conversion material (such as manganese oxide, molybdenum oxide, nickel oxide, and/or copper oxide). The anode active materials can be used alone or mixed together to form multi-phase materials (such as Si—C, Sn—C, SiOx—C, SnOx—C, Si—Sn, Si—SiOx, Sn—SnOx, Si—SiOx—C, Sn—SnOx—C, Si—Sn—C, SiOx—SnOx—C, Si—SiOx—Sn, or Sn—SiOx—SnOx.).

The electrode film may comprise a binder. In some embodiments, the electrode film comprises the binder in, in about, in at most, in at most about, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 15 wt. %, 20 wt. % or 25 wt. %, or any range of values therebetween. In some embodiments, the binder is a polymerizable binder. In some embodiments, the polymerizable binder is electron beam ("e-beam" or "EB") polymerizable and/or curable. Binders may include an acrylated polyurethane resin (e.g. Ucecoat 7689, Ucecoat 7510, and Ucecoat 7690 (i.e. a polyurethane acrylate, acrylate ester and/or acrylated monomer dispersion in water)), a hydroxy modified acrylated polyurethane resin (e.g., hydroxy modified Ucecoat 7690), an acrylate-methacrylate monomer blend (e.g. Ebecryl 109), a monoacrylate of mono-ethoxylated phenol (e.g. Ebecryl 114), trimethylolpropane ethoxy triacrylate (TMPEOTA), polytetrafluoroethylene (PTFE), a polyolefin, polyalkylenes, polyethers, styrene-butadiene, copolymers of polysiloxanes, a polysiloxane, branched polyethers, polyvinylethers, polyacrylic acid (PAA), styrene-butadiene rubber (SBR), co-polymers thereof, and/or admixtures thereof. The binder can include a cellulose, for example, carboxymethylcellulose (CMC). In some embodiments, the polyolefin can include polyethylene (PE), polypropylene (PP), polyvinylidene fluoride (PVDF), co-polymers thereof, and/or mixtures thereof. For example, the binder can include polyvinylene chloride, poly(phenylene oxide) (PPO), polyethylene-block-poly(ethylene glycol), poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In some embodiments, the binder may include an acrylated polyurethane resin, an acrylate-methacrylate monomer blend, a monoacrylate of mono-ethoxylated phenol, polyvinylidene fluoride (PVDF), and combinations thereof. In some embodiments, the binder may include an acrylated polyurethane resin, an acrylate-methacrylate monomer blend, a monoacrylate of mono-ethoxylated phenol, and combinations thereof.

The electrode film may comprise an additive. In some embodiments the electrode film comprises the additive in, in about, in at most, in at most about, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 15 wt. %, 20 wt. % or 25 wt. %, or any range of values therebetween. In some embodiments, the additive is a conductive additive. In some embodiments, conductive additives may be selected from carbon black, carbon nano-particles, a graphitic material, graphite, graphene-containing materials, hard carbon, soft carbon, carbon nanotubes, carbon nanofibers, porous carbon, conductive carbon, or a combination thereof. In some embodiments, the graphitic material can be a surface treated material. In some embodiments, the porous carbon can comprise activated carbon. In some embodiments, the porous carbon can comprise hierarchically structured carbon. In some embodiments, the porous carbon can include structured carbon nanotubes, structured carbon nanowires and/or structured carbon nanosheets. In some embodiments, the porous carbon can include graphene sheets. In some embodiments, the porous carbon can be a surface treated carbon.

The energy storage device 200 can include any number of different types of electrolyte. For example, in some embodiments the device 200 can include a lithium ion battery electrolyte, which can include a lithium source, such as a lithium salt, and a solvent, such as an organic solvent. In some embodiments, the device can further include an additive, such as solid electrolyte interphase (SEI)-forming additive, an electrode wetting additive, or a separator wetting additive. In some embodiments, a lithium salt can include lithium hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), lithium bis(pentafluoroethanesulfonyl)imide ($C_4FioLiNO_4S_2$), lithium bis(fluorosulfonyl)imide ($F_2LiNO_4S_2$), lithium bis(oxalato) borate ($LiB(C_2O_4)_2$), lithium difluoro(oxalato) borate ($LiBF_2(C_2O_4)$), lithium difluorophosphate ($F_2LiO_2P$), lithium oxalyldifluoroborate, lithium trifluorochloroborate ($LiBF_3Cl$), lithium hexafluoroarsenate ($LiAsF_6$), combinations thereof, and/or the like. In some embodiments, a lithium ion electrolyte solvent can include one or more ethers and/or esters. For example, a lithium ion electrolyte solvent may comprise ethylene carbonate (EC), dimethyl carbonate (DMC), diethyl carbonate (DEC), ethyl methyl carbonate (EMC), vinyl carbonate (VC), propylene carbonate (PC), combinations thereof, and/or the like. For example, the electrolyte may comprise $LiPF_6$, ethylene carbonate, propylene carbonate and diethyl carbonate. In some embodiments, the device can include a solid state electrolyte. In some embodiments, the solid state electrolyte also functions as a separator.

Electrodes described herein may be prepared by various processes. As one example, in some embodiments an electrode film mixture (e.g. comprising the active material, binder, and optionally additives) are combined with a solvent to form an electrode film slurry. In some embodiments, the solvent is an aqueous solvent, an organic solvent, or a combination thereof. As another example, in some embodiments an electrode film mixture (e.g. comprising the active material, binder, and optionally additives) is combined and an electrode film is formed in a solvent-free dry electrode manufacturing process. In some embodiments, the electrode film mixture further comprises a surfactant and/or an additive (e.g. a conductive additive). In some embodiments, the solvent includes water, N-methylpyrrolidone (NMP), other organic solvents, or combinations thereof. The electrode film slurry may then be cast upon a substrate to form an as-cast electrode film. In some embodiments, casting of the electrode film slurry may be performed using a doctor blade, spray coating, comma bar, slot die, aerosol, gravure, screen printing, imprinting, spin-coating, electrospinning, ultrasonic spray, electrostatic spray, and combinations thereof. The as-cast electrode film may then be dried and/or cured to form an electrode film. In some embodiments, the as-cast electrode film or electrode film is calendered (e.g. a roll-to-roll process). In solvent-free dry electrode manufacturing processes the electrode film may be formed using dry materials, such as a calendering process. In some embodiments, the substrate which the dry electrode film or electrode film slurry is cast upon is a current collector, and as such an electrode is formed once the electrode film is deposited, dried and/or cured.

Drying may be performed by heating the as-cast electrode film to evaporate the solvent. Curing may be performed to polymerize the binder to form a binder matrix within the electrode film. In some embodiments, curing is performed by an energy source, such as for example photons and/or electrons. In some embodiments, curing is performed by an electron beam ("e-beam" or "EB"). In some embodiments, the curing is performed with an EB with, with about, with at least, or with at least about, 50 kV, 100 kV, 150 kV, 200 kV, 250 kV 300 kV, or any range of values therebetween. In some embodiments, the curing is performed with an EB with, with about, with at least, or with at least about, 15 kGy, 20 kGy, 25 kGy, 30 kGy, 40 kGy, 50 kGy, 60 kGy, 70 kGy, 80 kGy or 100 kGy, or any range of values therebetween.

Example binders, slurry solutions and/or curing conditions that may be utilized in forming layers of multilayer electrode films include: 1) PVDF binder dissolved in NMP solvent; 2) PAA/CMC/SBR binders dissolved in water; and 3) an EB curable polymers composed of acrylates and polyurethanes that are dissolvable in various solvents, and curing using electron beam polymerization.

In some embodiments, the energy storage device 200 (e.g., battery) comprising the multilayer and/or multidimensional electrode film may be applicable to be electrically connected and physically attached to a flexible device comprising a soft material, such as plastics, thin films, and combinations thereof.

Multilayered Electrode Film

The present disclosure describes multilayer heterogenous electrode films where an electrode film includes multiple layers of heterogenous compositions. In some embodiments, a multilayered electrode film is utilized in at least one electrode 202, 206.

As a comparative example, a homogenous electrode film may be composed of three ingredients: with active material ranging from 80 to 95%, conductive materials 5 to 20%, and binder from 5 to 20%. A single layer of such as an electrode 202, 206 may also be 200 microns thick, and would be generally homogenous at any point in the film (e.g., in the X, Y, and Z dimensions). An example of a homogeneous single layer electrode film is shown in Table 1.

TABLE 1

| Homogeneous | Thickness | Active Material % | Conductive Material, % | Binder, % |
|---|---|---|---|---|
| | 200 | 90 | 5 | 5 |

In contrast, in a multilayer heterogenous electrode film design the electrode film may also be designed to have a final thickness of 200 microns, but is composed of individual layers with varying compositions of ingredients. The multilayer electrode film may comprise a first electrode film layer, which is intended to interface with and/or contact a current collector, and an exterior electrode film layer, which forms the exterior surface of the electrode film opposite the first electrode film layer. In some embodiments, the multilayer electrode film comprises a first layer (i.e., base layer) in contact with the current collector. In some embodiments, the multilayer electrode film may further comprise at least one bulk electrode film layer disposed between the first electrode film layer and the exterior electrode film layer. For example, in a first electrode film layer, the composition may have a higher concentration of binder and a decreased concentration of active material relative to the homogeneous electrode film. In some embodiments, the first coated layer may be used to improve adhesion of the multilayer electrode film with the current collector. In some embodiments, the subsequent bulk electrode film layers of the multidimensional electrode film may follow the first layer with the same or similar compositions to that of a homogenous electrode film, although with a relatively thinner thickness. In some embodiments, the exterior electrode film layer that is designed to interface with the separator may include increased active material concentrations relative to a homogeneous electrode film. In some embodiments, a low conductivity and a high energy density is required in the exterior electrode film. It is to be understood that the compositions and layers may vary for the anode and cathode. An example of a homogeneous electrode film is shown in Table 2.

TABLE 2

| Heterogeneous Type | Thickness | Active Material % | Conductive Material, % | Binder, % |
|---|---|---|---|---|
| Interface with Separator | 50 | 93 | 2 | 5 |
| Bulk Electrode | 100 | 90 | 5 | 5 |
| Bulk Electrode | 100 | 85 | 10 | 5 |
| Interface with Current Collector | 50 | 80 | 10 | 10 |
| Total | 200 microns | | | |

Figure 3A:
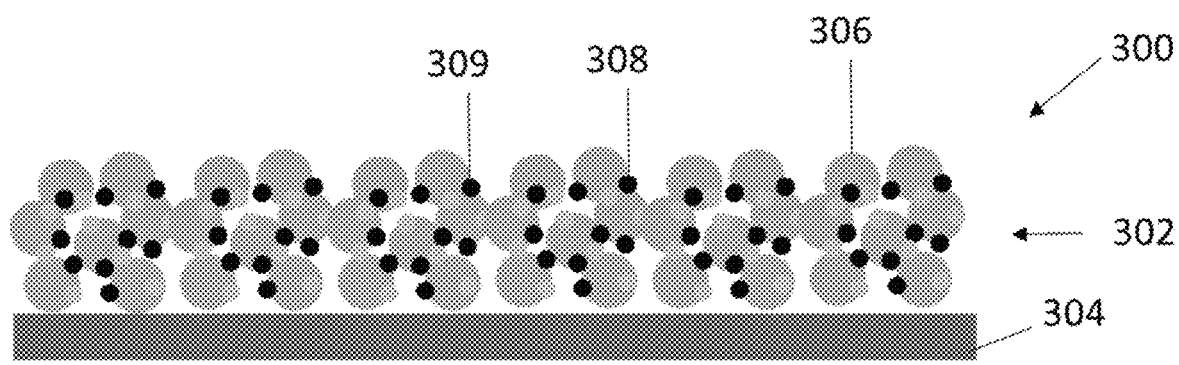
FIG. 3A is a cross-sectional illustration of a homogeneous single layer electrode film.
Figure 3B:
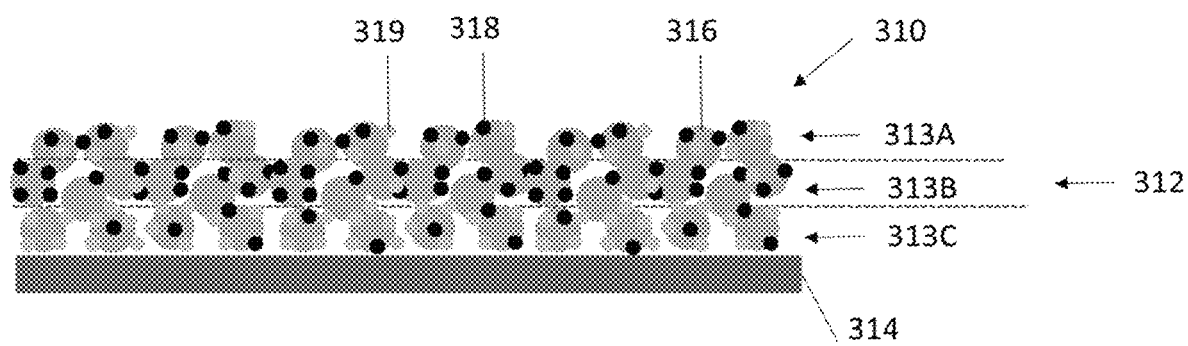
FIG. 3B is a cross-sectional illustration of a multilayered electrode, according to some embodiments.

An example of a homogeneous single layer electrode film is depicted in FIG. 3A, and an example of a multilayered electrode film is depicted in FIG. 3B. FIG. 3A depicts the cross-sectional illustration of a conventional homogeneous single layer electrode 300 which comprises a single homogeneous electrode film 302 disposed over a current collector 304, wherein the single homogeneous electrode film 302 comprises active material particles 306, conductive additive particles 308 and binder particles 309. In contrast, FIG. 3B shows a cross-sectional illustration of a multilayered electrode 310. The multilayered electrode 310 comprises a multilayered electrode film 312 that comprises an exterior electrode film layer 313A, a bulk electrode film layer 313B and an interior first electrode film layer 313C. Each of the exterior electrode film layer 313A, bulk electrode film layer 313B and interior first electrode film layer 313C comprise active material particles 316, conductive additive particles 318 and binder particles 319. However, the exterior electrode film layer 313A is depicted with a relatively increased concentration of active material particles 316 and may be referred to as a high energy density layer, the bulk electrode film layer 313B is depicted with a relatively increased concentration of the conductive additive particles 318 and therefore may be referred to as a high conductivity layer, and the interior first electrode film layer 313C is depicted with a relatively increased concentration of the binder particles 319 and therefore may be referred to as a high binding layer. The multilayered electrode film 312 is disposed over a current collector 314, wherein the first electrode film layer 313C is in contact with the current collector 314, wherein the bulk electrode film layer 313B is in contact with the exterior electrode film layer 313A on a first side and the first electrode film layer 313C on a second side, and wherein the exterior electrode film layer 313A is in contact with the bulk electrode film layer 313B on a first side and the second side of the exterior electrode film layer 313A is not shown in contact with an additional surface or layer. In some embodiments, such as when a multilayer electrode is assembled in an energy storage device, the second side of the exterior electrode film layer 313A may contact an additional surface or layer. For example, in some embodiments, the second side of the exterior electrode film layer 313A may contact a separator.

In some embodiments, at least two layers of the multilayer electrode film have different compositions and/or material properties. In some embodiments, each layer of the multilayer electrode film have different compositions and/or material properties. For example, in some embodiments, the first electrode film layer may be characterized as having a first composition and/or material characteristic (e.g., "X" composition and/or characteristic). In some embodiments, exterior electrode film layer may be characterized as having a second composition and/or material characteristic (e.g., "Y" composition and/or characteristic). In some embodiments, the at least one bulk electrode film layer may be characterized as having a second composition and/or material characteristic (e.g., "Y" composition and/or characteristic).

A multilayered electrode film includes a plurality of electrode film layers. In some embodiments, the multilayered electrode film comprises, comprises at least, or comprises at most, 2, 3, 4, 5, 6, 7, 8, 9, 10, 12, 15, 20 or 21 electrode film layers, or any range of values therebetween. In some embodiments, the first electrode film layer comprises, comprises at least, or comprises at most, 1, 2, 3, 4, 5, 6, 7, 8, 9, 10, 12, 15 or 20 electrode film layers, or any range of values therebetween. In some embodiments, the exterior electrode film layer comprises, comprises at least, or comprises at most, 1, 2, 3, 4, 5, 6, 7, 8, 9, 10, 12, 15 or 20 electrode film layers, or any range of values therebetween. In some embodiments, the bulk electrode film layer comprises, comprises at least, or comprises at most, 1, 2, 3, 4, 5, 6, 7, 8, 9, 10, 12, 15 or 20 electrode film layers, or any range of values therebetween. In some embodiments, an individual layer (e.g., first, bulk and/or exterior layer) of the multilayered electrode film comprises a thickness of, of about, of at most, or of at most about, 10 µm, 20 µm, 25 µm, 30 µm, 35 µm, 40 µm, 50 µm, 75 µm, 100 µm, 125 µm, 150 µm, 175 µm or 200 µm, or any range of values therebetween.

In some embodiments, the first electrode film layer comprises an active material in, in about, in at most, or in at most about, 55 wt. %, 60 wt. %, 62 wt. %, 65 wt. %, 68 wt. %, 70 wt. %, 72 wt. %, 75 wt. %, 78 wt. %, 80 wt. %, 81 wt. %, 82 wt. %, 83 wt. %, 84 wt. %, 85 wt. %, 86 wt. %, 87 wt. %, 88 wt. %, 89 wt. % or 90 wt. %, or any range of values therebetween. In some embodiments, the first electrode film layer comprises binder in, in about, in at least, or in at least about, 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. % or 25 wt. %, or any range of values therebetween. In some embodiments, the exterior electrode film layer comprises an active material in, in about, in at least, or in at least about, 88 wt. %, 89 wt. %, 90 wt. %, 91 wt. %, 92 wt. %, 93 wt. %, 94 wt. %, 95 wt. %, 96 wt. %, 97 wt. %, 98 wt. % or 99 wt. %, or any range of values therebetween. In some embodiments, the exterior electrode film layer comprises binder in, in about, in at most, or in at most about, 0.1 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 11 wt. % or 12 wt. %, or any range of values therebetween. In some embodiments, each bulk electrode film layer comprises an active material in, in about, in at least, or in at least about, 75 wt. %, 78 wt. %, 80 wt. %, 81 wt. %, 82 wt. %, 83 wt. %, 84 wt. %, 85 wt. %, 86 wt. %, 88 wt. %, 89 wt. %, 90 wt. %, 91 wt. %, 92 wt. %, 93 wt. %, 94 wt. % or 95 wt. %, or any range of values therebetween. In some embodiments, each bulk electrode film layer comprises binder in, in about, in at most, or in at most about, 0.1 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 11 wt. % or 12 wt. %, or any range of values therebetween. In some embodiments, a bulk electrode film layer may comprise a conductive material in, in about, in at least, or in at least about, 0.1 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 25 wt. %, 50 wt. %, 75 wt. %, 90 wt. %, 95 wt. %, 98 wt. %, 99 wt. % or 100 wt. %, or any range of values therebetween.

In some embodiments, each of the electrode film layers (e.g., thin functional films) may be sequentially applied or disposed over the current collector and/or previously applied electrode film layers to form the multilayered electrode film. For example, in some embodiments a multi-layer slot die coater may be utilized to sequentially apply each of the electrode film layers (e.g., thin functional films) of a multilayered electrode film at high velocities. In some embodiments, the each of the electrode film layers (e.g., first layer) may be applied using a roll-roll coating process, and/or processes such as doctor blade, spray coating, comma bar, slot die, aerosol, gravure, screen printing, imprinting, spin-coating, electrospinning, ultrasonic spray, electrostatic spray, and combinations thereof. In some embodiments, the application process (e.g., roll-roll coating process) may be used to apply (e.g., coat) a slurry or mixture onto the current collector, electrode film and/or electrodes. In some embodiments, the mixture may include active materials, conductive additives, binders or conductive ceramic materials, wherein these materials can encompass multiple morphologies including, but not limited to powders, nanopowders, fibers, nanoflakes, and polymer chains. In some embodiments, the slurry when coated with various roll-to-roll processes as described herein may provide electrodes, electrode films and/or electrolyte films that may provide high temperature longevity, high-rate capability, high coulombic efficiency, good cyclability of the resulting energy storage device (e.g., battery), high loading weight in units of mg/cm2, control microstructure and porosity, and/or controlled multilayers that have various ratios of their comprised compositions. In some embodiments, the slurry may be the first material. In some embodiments, the slurry may be characterized by density, viscosity and solid content.

In some embodiments, the multidimensional electrode film comprises a gradient of porosity from the first electrode film layer to the exterior electrode film layer. In some embodiments, the porosity increases from the first electrode film layer to the exterior electrode film layer. In some embodiments, the porosity decreases from the first electrode film layer to the exterior electrode film layer.

Multidimensional Electrode Film

The present disclosure describes multidimensional electrode films where an electrode film includes at least one electrode film layer with a structure characterized as having greater than two dimensions (e.g., 2.5D or 3D). In some embodiments, a multidimensional electrode film is utilized in at least one electrode. In some embodiments, an electrode film is multidimensional and multilayered.

In some embodiments, the multidimensional electrode film comprises a high-aspect ratio additive. In some embodiments, the additive is a conductive additive. In some embodiments, the multidimensional electrode film comprises an EB curable binder. Multidimensional electrode films may comprise composites of high-aspect ratio additives (e.g., conductive additives, such as carbon nanofibers) and EB curable binders. Such composite multidimensional electrode films may be utilized to rapidly manufacture multidimensional electrodes, and may be capable of outperforming planar electrodes with regard to energy density, power density, cost, and/or manufacturing output for energy storage devices. The use of such EB curable binders, additives and/or other advanced materials may form elastic networks of ingredients (e.g., active materials, binders and/or additives) that improve the durability of multidimensional electrode films. In addition, EB curable binders may provide manufacturing advantages, such as saving energy and ultra-high-speed coating >500 $m^2$/min, which is on par with traditional planar electrode coating (>500 $m^2$/min, slot die coating). In some embodiments, multidimensional electrode films can be manufactured through the roll-to-roll coating and selective curing with lift-off of uncured electrodes, which may enable an average manufacturing speed beyond 20 $m^2$/min to make multidimensional architectures a more energy-dense, power capable, safer, and cost-effective replacement to planar energy storage device architectures.

Figure 4:
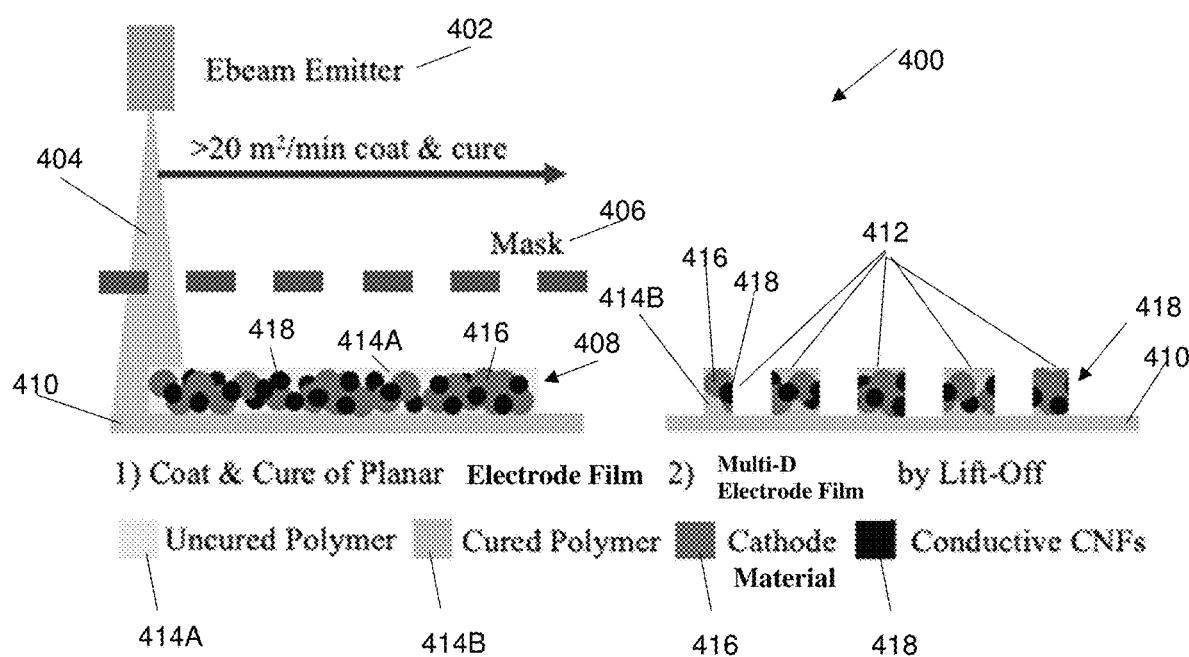
FIG. 4 is an illustration of a multidimensional electrode film and a method of manufacture thereof, according to some embodiments.

FIG. 4 illustrates a method of manufacturing 400 a multidimensional electrode film. An EB emitter 402 is shown producing a EB radiation source 404 that is blocked by the mask 406 and passes through the apertures of the mask 406 onto a precursor electrode film 408 disposed over a substrate 410, wherein the precursor electrode film 408 comprises uncured polymer 414A, cathode material 416 and conductive nanofibers (CNFs). The EB light radiation 404 is depicted as moving from a proximal end to a distal end of the precursor electrode film 408, while the mask 406 and the precursor electrode film 408 remain stationary. The method of manufacturing 400 depicts the precursor electrode film 408 deposited on the substrate 410 in a planar architecture at a coating rate of >20 $m^2$/min, and the EB emitter 402 moving at a speed of >20 $m^2$/min. Once the curing process is complete, the EB emitter 402 and the mask 406 are removed, the uncured portions of the precursor electrode film 408 that correspond to the portions of the mask 406 are removed, and a multidimensional electrode film 418 comprising a plurality of multidimensional electrode film portions 412 remains disposed over the substrate 410. Each of the plurality of multidimensional electrode films portions 412 comprise cured polymer 414B, cathode material 416 and conductive nanofibers (CNFs). Each of the plurality of multidimensional electrode films portions 412 are shown spaced apart from each other by a space or a void corresponding to the portions of the mask 406 and precursor electrode film 408 that were not cured and contained uncured polymer 414A. The method of manufacturing the multidimensional electrode film 400 or similar methods may be repeated to form any number of subsequent multidimensional electrode film layer disposed over the multidimensional electrode film 418 depicted, such that the electrode film is a multilayer electrode film.

In some embodiments, the substrate 410 is a current collector. In some embodiments, the multidimensional electrode film is removed from the substrate 410 and subsequently disposed over a current collector. In some embodiments, the mask 406 is a metal mask (e.g., a chrome or stainless steel mask). In some embodiments, the mask 406 acts as a shield over the first layer during exposure from the electron beam light radiation 404 to prevent the curing of certain portions of the electrode from binding crosslinking, polymerizing and any reaction that cause bond formation, attraction or degradation binder. In some embodiments, the electron beam light radiation 404 may facilitate the binding of the mixture to the electrodes. In some embodiments, the electron beam light radiation 404 may be focused on the electrode film. In some embodiments, the electron beam light radiation 404 may be configured for producing photochemical reactions. In some embodiments, removal of the uncured portion of the electrode film subsequent to EB curing produces "pillars" of the multidimensional electrode film portions 412. In some embodiments, removal of the uncured portion of the electrode film subsequent to EB curing may be performed by a solvent. In some embodiments, solvents may be selected from water, isoborneol acrylate, 1,6-hexanediol diacrylate, toluene, xylene, hexanes, and combinations thereof. In some embodiments, a pillar may have a thickness of, of about, of at least, or of at least about 10 um, 15 um, 20 um, 25 um, 50 um, 75 um, 100 um, 150 um, 200 um, 250 um, 300 um, 400 um, 500 um, 600 um, 700 um, 800 um, 900 um, 1000 um, 1200 um or 1500 um, or any range of values therebetween. In some embodiments, a pillar may have a height of, of about, of at least, or of at least about 10 um, 15 um, 20 um, 25 um, 50 um, 75 um, 100 um, 150 um, 200 um, 250 um, 300 um, 400 um, 500 um, 600 um, 700 um, 800 um, 900 um, 1000 um, 1200 um or 1500 um, or any range of values therebetween. In some embodiments, a pillar may have a height to thickness aspect ratio of, of about, of at least, or of at least about, 1:5, 1:2, 1:1, 2:1, 3:1, 5:1, 8:1, 10:1, 12:1, 15:1, 20:1, 25:1 or 30:1, or any range of values therebetween.

Figure 5:
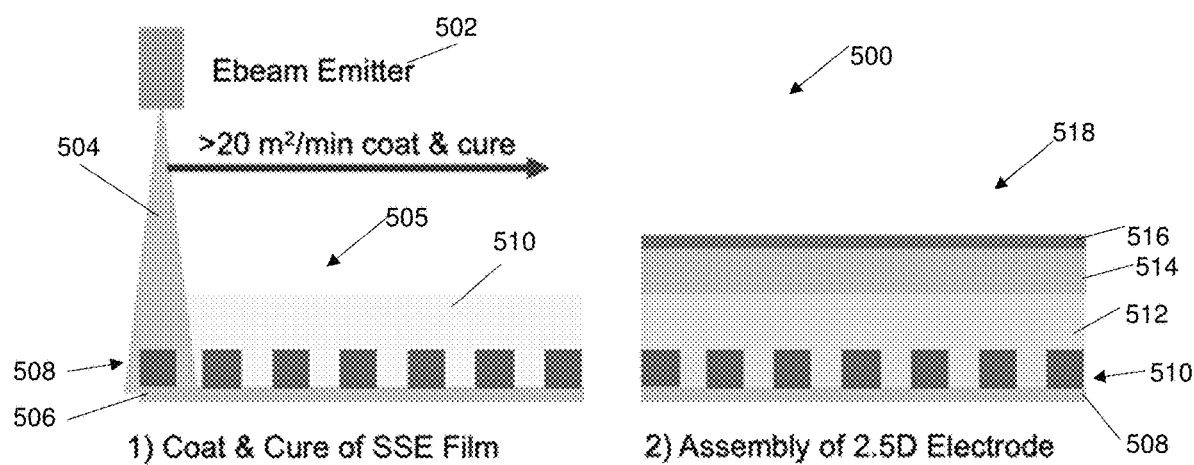
FIG. 5 is an illustration of a multilayer multidimensional electrode film and a method of manufacture thereof, according to some embodiments.

FIG. 5 illustrates a method of manufacturing 500 a multilayer multidimensional electrode film. An EB emitter 502 is shown producing a EB radiation source 504 onto a precursor multilayer multidimensional electrode film 505 disposed over a substrate 506, wherein the multilayer multidimensional electrode film 505 comprises a first multidimensional layer 508 comprising a plurality of portions, and a second precursor layer 510 disposed over and between the voids of the plurality of portions of the first multidimensional layer 508. The second precursor layer 510 may be deposited and subsequently cured by the EB emitter 502 and EB radiation source 504 at a rate of >20 m²/min to form a second cured layer 512. By a similar process as those detailed in the present disclosure, additional multilayers may be deposited and/or cured to form a third planar layer 514, and a fourth planar layer 516 which together form the multilayer multidimensional electrode film 518 with 2.5 dimensionality (i.e., 2.5D).

In some embodiments, each layer of the multilayer and/or multidimensional electrode film may individual include an active material, a binder, an additive, or combinations thereof. For example, whereas a first layer may include an active material, a binder and an additive, a second layer may include a binder.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount, depending on the desired function or desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The headings provided herein, if any, are for convenience only and do not necessarily affect the scope or meaning of the devices and methods disclosed herein.

What is claimed is:

1. A multilayer electrode film comprising:
   a first electrode film layer comprising a first interface surface and a second interface surface, a first binder and a first binder concentration, and a first active material and a first active material concentration; and
   an exterior electrode film layer comprising a third interface surface and a fourth interface surface, an exterior binder and an exterior binder concentration, and an exterior active material and an exterior active material concentration;
   wherein the first binder concentration is greater than the exterior binder concentration;
   wherein the exterior active material concentration is greater than the first active material concentration;
   wherein the first and second interface surfaces are disposed over the third and fourth interface surfaces; and
   wherein at least one of the first and exterior binders is an electron beam polymerized binder.

2. The multilayer electrode film of claim 1, further comprising a bulk electrode film layer disposed between the first electrode film layer and the exterior electrode film layer, wherein the bulk electrode film layer comprises a fifth interface surface and a sixth interface surface, a bulk binder and a bulk binder concentration, and a bulk active material and a bulk active material concentration.

3. The multilayer electrode film of claim 2, wherein the bulk electrode film layer comprises a plurality of electrode film layers.

4. The multilayer electrode film of claim 2, wherein the bulk electrode film layer comprises about 85 wt. % to about 90 wt. % of the bulk active material.

5. The multilayer electrode film of claim 1, wherein the multilayer electrode film comprises a total thickness of at least 200 um.

6. The multilayer electrode film of claim 1, wherein the first electrode film layer comprises about 75 wt. % to about 85 wt. % of the first active material.

7. The multilayer electrode film of claim 1, wherein the exterior electrode film layer comprises about 91 wt. % to about 96 wt. % of the exterior active material.

8. An electrode comprising the multilayer electrode film of claim 1 disposed over a current collector.

9. An energy storage device comprising:
   the electrode of claim 8;
   a second electrode;
   a separator disposed between the electrode and second electrode; and
   a housing, wherein the electrode, second electrode and separator are disposed within the housing.

10. The multilayer electrode film of claim 1, wherein the first and exterior active materials are each individually selected from the group consisting of carbon monofluoride, a metal oxide, a metal sulfide, a lithium metal oxide, an insertion material, an alloying/dealloying material, a metallic element, a metal compound, a conversion material, and combinations thereof.

11. The multilayer electrode film of claim 10, wherein at least one of the first and exterior active materials is carbon monofluoride.

12. The multilayer electrode film of claim 1, wherein the first binder is an electron beam polymerized binder.

13. The multilayer electrode film of claim 12, wherein the exterior binder is an electron beam polymerized binder.

14. The multilayer electrode film of claim 1, wherein the first and exterior binders are each individually selected from the group consisting of an acrylated polyurethane resin, a hydroxy modified acrylated polyurethane resin, an acrylate-methacrylate monomer blend, a monoacrylate of mono-ethoxylated phenol, trimethylolpropane ethoxy triacrylate (TMPEOTA), polytetrafluoroethylene (PTFE), a polyolefin, a polyalkylene, a polyether, styrene-butadiene, a co-polymer of polysiloxanes, a polysiloxane, a branched polyether, a polyvinylether, polyacrylic acid (PAA), styrene-butadiene rubber (SBR), a cellulose, co-polymers thereof, and combinations thereof.

15. The multilayer electrode film of claim 1, wherein the first and exterior binders are each individually selected from the group consisting of an acrylated polyurethane resin, a hydroxy modified acrylated polyurethane resin, an acrylate-methacrylate monomer blend, a monoacrylate of mono-ethoxylated phenol, trimethylolpropane ethoxy triacrylate (TMPEOTA), co-polymers thereof, and combinations thereof.

16. The multilayer electrode film of claim 1, wherein the first electrode film layer further comprising a first conductive additive and a first conductive additive concentration, and the exterior electrode film layer further comprises an exterior conductive additive and an exterior conductive additive concentration.

17. The multilayer electrode film of claim 16, wherein each of the first and exterior electrode films layers individually comprise 0.5-15 wt. % of the first and exterior conductive additives respectively.

18. The multilayer electrode film of claim 16, wherein the first conductive additive concentration is greater than the exterior conductive additive concentration.

19. The multilayer electrode film of claim 16, wherein the first and exterior conductive additives are each individually selected from the group consisting of carbon black, carbon nano-particles, a graphitic material, graphite, a graphene-containing material, hard carbon, soft carbon, carbon nanotubes, carbon nanofibers, porous carbon, conductive carbon, and combinations thereof.

20. A method of fabricating the multilayer electrode film of claim 1, comprising:
    disposing a first electrode film precursor layer over a substrate;
    curing the first electrode film precursor layer into the first electrode film layer;
    disposing an exterior electrode film precursor layer over the first electrode film layer; and
    curing the exterior electrode film precursor layer into the exterior electrode film layer.

\* \* \* \* \*